United States Patent [19] [11] 3,751,648
Wu [45] Aug. 7, 1973

[54] GENERALIZED SHIFT REGISTER PULSE SEQUENCE GENERATOR

[75] Inventor: William W. Wu, Olney, Md.
[73] Assignee: Communications Satellite Corporation, Washington, D.C.

[22] Filed: Dec. 1, 1971
[21] Appl. No.: 203,702

[52] U.S. Cl. ........ 235/152, 328/61, 331/78
[51] Int. Cl. ........ G06f 1/02
[58] Field of Search ........ 235/152, 197; 331/78; 328/60, 61

[56] References Cited

UNITED STATES PATENTS

| | | | |
|---|---|---|---|
| 3,557,356 | 1/1971 | Balza et al. | 235/152 |
| 3,614,400 | 10/1971 | Farnett et al. | 235/152 |
| 3,609,327 | 9/1971 | Paine | 235/152 |
| 3,614,399 | 10/1971 | Linz | 235/152 |

*Primary Examiner*—Malcolm A. Morrison
*Assistant Examiner*—James F. Gottman
*Attorney*—Richard C. Sughrue, Darryl Mexic et al

[57] ABSTRACT

A generalized pulse sequence generator comprises a plurality of shift register generators, each providing a pulse sequence output. In order to produce one pulse in the sequence the states of the corresponding stages of each shift register generator are modulo-2 multiplied and the resultant outputs from the final multiplier are summed. The shift register generators are clocked at different rates to cause certain ones to run through a complete sequence of register states while others remain at one of their register states. The output sequence comprises a combination of binary pulses, each of which is a result of one multiplication/summation operation and has a period *n* which is equal to the product of the periods of the individual shift register generators.

5 Claims, 2 Drawing Figures

GENERALIZED SHIFT REGISTER PULSE SEQUENCE GENERATOR

BACKGROUND OF THE INVENTION

The invention is in the field of pseudo random pulse sequence generators.

It is well known that shift register generators can be made to provide cyclic sequences of pulses, often referred to as pseudo random sequences. Such sequences find use in signal correlation operation in such fields as digital computers, random number generation, and communications work. Examples of such use are well known and need not be described herein. Generally, these sequences are described as a binary field and the equipment used with these sequences are binary logic circuits. Processing of the binary signals is performed by modulo-2 arithmetic techniques as is well known in the art.

The classical pulse sequence generator is the feedback or feed forward shift register generator. In the former, only a single shift register is employed and certain of the succeeding stages of the shift register are logically combined and fed back to the first stage. If the mathematical function by which the feedback is accomplished is linear, the device is called a linear feedback shift register. Such devices have been extensively studied and it is known that for a *m*-stage linear shift register which can generate a sequence having a maximal period *n* where *n* 32 $2^m$31 1 there are exactly $\phi(2^m-1)/m$ distinct choices of linear configurations which can be used to provide a feedback function. It is well known that in this equation, $\phi(K)$ is Euler's function — the number of positive integers less than or equal to (K) which are also relatively prime to (K). For a given number of stages in a linear register which is required to produce a pulse sequence of a given length, the classical theory limits the number of shift register feedback functions which can provide a unique combination of pulses. For example, in a register having six stages and required to produce a 63 pulse sequence, only 12 linear feedback configurations which can generate a unique combination of pulses are available. This limitation has particular significance in code correlation operations where a transmitter having six stage linear generator can send only 12 unique code combinations to identify a receiving station but there are more than 12 receiving stations which require a unique code to the sequence.

It is also known that the accuracy of a code may be increased by adding more pulses to the sequence. The maximal period of the generated sequence for a single *m*-stage register can be increased to $2^m$ and the number of distinct feedback functions to $2[2^{(m-l)}-m]$ if the feedback function is allowed to contain nonlinear operations.

As a further extension of the art, Reed and Turn have shown in a paper entitled "A Generalization of Shift-Register Sequence Generators", at pp. 461–473 of the *Journal of the Association for Computing Machinery*, Vol. 16, No. 3, July 1969, that both the number of unique sequences which can be generated from a given number of stages as well as the sequence period may be increased. The article teaches that a sequence $n > 2^m-1$ can be obtained from a single *m*-stage register by a controlled use of multiple feedback logics for a single generator. In particular, the paper shows that an *m*-stage shift register with *k* feedback logics can generate large numbers of sequences of maximal periods $k(2^m-1)$ for linear, or $k2^m$ for nonlinear logics. This approach requires complicated switching among feedback logics. A present practical difficulty with the Reed and Turn approach is that it is mathematically and structurally very difficult, if not impossible in certain cases, to figure out the necessary feedback logics. None of these prior art techniques teach a generalized and simple approach to the generation of sequences of a predictable number of pulses which also provides for an expanded number of sequence configurations.

SUMMARY OF THE INVENTION

In accordance with the present invention a cyclic pulse sequence generator is provided for generating relatively long sequences with several shift register generators, each having relatively few stages. The generalized sequence generator of the present invention is achieved by combining two or more shift register generators in a manner to provide a sequence $n_g = n_0 \cdot n_1 \ldots n_i$ where $n_i$ is the sequence length of the ith shift register. The shift registers which comprise the generalized sequence generator may be of any known type including the classical linear feedback shift register generator and even the Reed and Turn type of generator.

Each of the generators is cycled at different clock rate, resulting in a different rate of change of the states for each of the generators. A "state" of a shift register is the particular sequence of all *m* binary digits in all stages of an *m* stage register at a given time. As an example, we shall assume a sequence generator which comprises three linear shift register generators ($G_0$, $G_1$, $G_2$) each having a respective sequence length ($n_0$, $n_1$, $n_2$). A clock source to generator $G_0$will vary the shift register state of $G_0$ until all states have been reached. Shift registers $G_1$ and $G_2$ will remain in their original states until all states of $G_0$ have been exhausted. Then, $G_1$ will change to its next state and $G_0$ will once again cycle through all of its states. $G_2$ will remain in its original state until $G_1$ has cycled through all of its states and is at its original state, etc.

Since the sequence length of $G_0$, $G_1$ and $G_2$ respectively are $n_0$, $n_1$ and $n_2$, the clock rate of $G_0$ is $x_0$, the clock rate between for $G_1$ will be $x_1 = 1/n_0\, x_0$, and the clock rate $G_2$ will be $x_2 = 1/n\, x_1$. The pulse input of the sequence generator is obtained by multiplying, modulo-2, the states of corresponding stages of all shift registers, and summing, the final modulo-2, product of this multiplication process. Modulo-2 computation is well known in the art of digital processing as an arithmetic technique of binary compution.

DETAILED DESCRIPTION OF THE DRAWINGS

Figure 2:
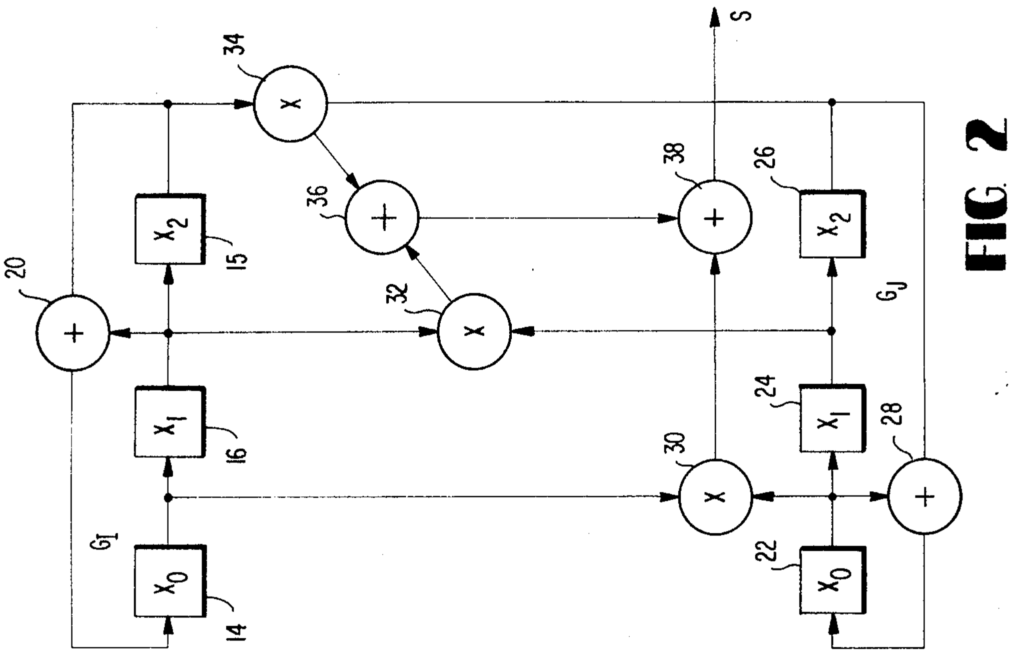
FIG. 2 is a block diagram of a specific example of one generator comprising two maximal length linear feedback shift registers.

Before referring to the drawings, a theory of the subjected generalized sequence generator will be provided.

A generalized shift-register generator, G, can be constructed from N general feedback and/or feed forward subgenerators of arbitrary lengths, $m_0, m_1, \ldots, m_{N-1}$.

The output sequence generated by G in the sequence domain is:

$$Z(D)=\sum_{d=0}^{n-1} A_d D^d \qquad (1)$$

The period, $n$, of the generator, G, is bounded by $$n \leq \prod_{\alpha=0}^{N-1} t_\alpha 2^{m_\alpha} \qquad (2)$$

where $t\alpha$ = the number of feedback transformations corresponding to the subgenerator, $\alpha A_d$ = the mod-2 sum of the product of the distinctive subgenerator state of time, $d$, from the set, $S$ and $$S=\sum_{W=0}^{n_{N-1}} \cdots \sum_{j=0}^{n_1} \sum_{i=0}^{n_0} S_i(X_0, X_1, \ldots, X_{m_0-1})\; S_j(X_0, X_1, \ldots, X_{m_1-1}) \; \cdots \; S_W(X_0, X_1, \ldots, X_{m_{N-1}-1}) \qquad (3)$$

As a consequence, if G is realized from classical nonlinear feedback shift-register subgenerators, which generate sequences with periods of $2^{o}, 2^{1}, \ldots, 2^{N-1}$, then the combined generator generates a sequence which has a period of $$2 \exp \sum_{\alpha=0}^{N-1} m_\alpha .$$

Figure 1:
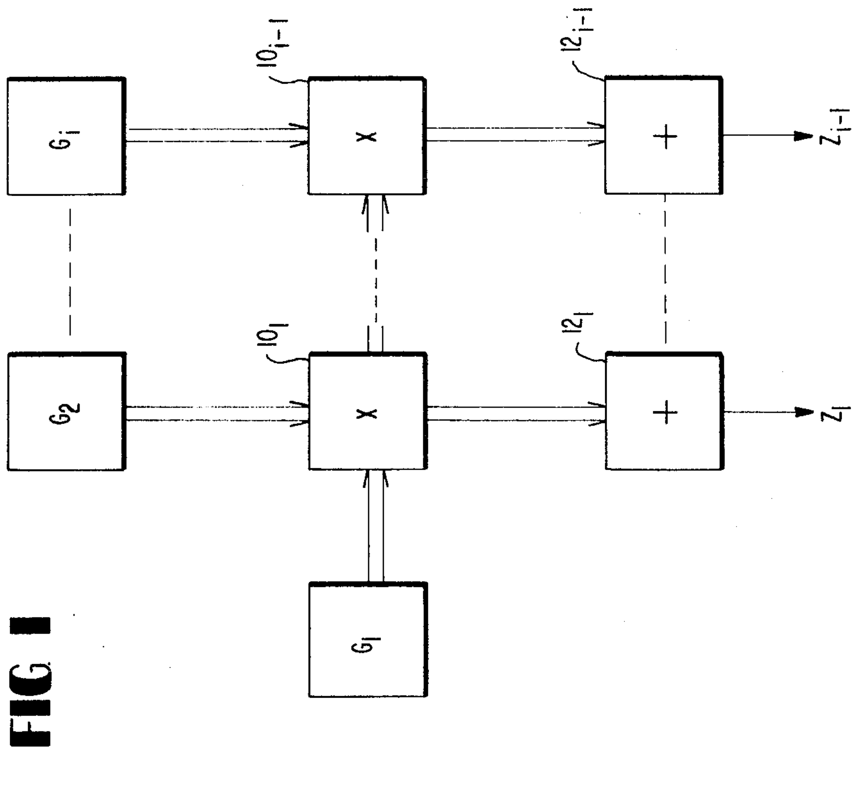
FIG. 1 is a block diagram of the generalized sequence generator of the present invention.

The general form of this invention is shown in FIG. 1, wherein a plurality of shift register generators $G_1$ through $G_i$ are shown combined by multiplication circuits $10_1 \ldots 10_{i-1}$ and summation circuits $12_1 \ldots 12_{i-1}$. As noted above, for purposes of this description it has been assumed that all mathematical operations are binary and accordingly, that multiplication and summation may be accomplished by modulo-2 arithmetic techniques. The modulo multiplication may be simply performed by AND circuits. The modulo summation may be performed by Exclusive-OR circuits. These and other equivalent types of modulo adder and multiplier circuits are well known in modulo-2 processing. The multiplication is performed among the states of the shift register generator or the resultants of such multiplication. the state of each stage of $G_1$ is modulo-2 multiplied by the state of the corresponding stage of $G_2$ and the products of this multiplication operation is a first resultant binary number. Then this resultant is modulo-2 multiplied by the state of the stages of $G_3$ and a second resultant is dervied. The states of all subsequent generators are similarly multiplied by the resultant product of the preceding generators state. Once the state of the stages of the final generator have been similarly multiplied, the resultant of this operation is modulo-2 added. This binary summation results in one binary pulse in the sequence generator output. The stage of the first generator is then changed (as well as other generators which have completed one cycle) and the modulo computation is repeated to produce the next sequence pulse. If only $G_1$ and $G_2$ are used, the output will be a sequence of period $n_s$ equal to $n_1 \times n_2$ where $n_1$ and $n_2$ are the respective periods of $G_1$ and $G_2$. The clock rate for $G_2$ will be $1/n_1$ times the clock rate for $G_1$. If $G_1$ through $G_i$ are used, and combined as indicated, the output sequence $S_{i-1}$ will have a period equal to the product of the periods of $G_1$ through $G_i$. The clock rates of the shift register generators will vary so that each generator runs through a complete cycle before the succeeding generator advances one clock pulse. It should be noted that the order of relative clock rates may be arbitrarily shifted while still preserving the value of the invention. For example, if two generators $G_1$ and $G_2$ are used, either $G_1$ may be operated at a clock rate $n_1$ times the rate for $G_2$, or $G_2$ may be operated at a rate $n_2$ times the rate of $G_1$.

FIG. 2 shows the specific case of a generator comprising two different three-stage maximal length linear feedback shift register generators $G_I$ and $G_J$. The period, $n$, for a three-stage maximal length linear feedback shift register generator is $(2^3-1)$ 32 7. Thus, the period of the output sequence in accordance with equation 2 is $n=(7)(7)=49$. Generator $G_I$ comprises shift register stages 14, 16 and 18, and modulo-2 adder 20. Generator $G_I$ is clocked in a known manner by clock pulses at a rate $ck_I$. Generator $G_J$ comprises stages 22, 24 and 26, and modulo-2 adder 28. Generator $G_J$ is clocked in a known manner by clock pulses at a rate $ck_J$. The rates $ck_I$ and $ck_J$ are chosen so that one is seven times greater than the other. This causes the state of one generator to remain in a static condition while the other generator completes a full cycle of states.

The multiplication means for combining the shift register states comprises modulo-2 multipliers 30, 32 and 34. The summation means for combining the multiplier outputs comprises modulo-2 adders 36 and 38. In this specific case of two generators there is only one multiplier operation performed before the summing. The output sequence for the example shown is:

1 0 1 1 1 0 0 0 0 1 0 1 1 1 0 1 1 1 0 0 1 1 1 0 0 1

0 1 1 1 1 0 0 1 0 1 0 0 1 0 1 1 0 1 0 1 1 1 0

One of the advantages of the invention, in addition to providing long sequences with several generators having relatively few stages, is that sequence generator can be formed from several small shift register generators which employ their maximum length without requiring complex feedback circuitry.

In general the shift register generators combined in accordance with the teachings of this invention may be any type and are not limited to maximal length linear feedback shift register generators as shown in FIG. 2.

I claim:

1. A pulse sequence generator comprising, a. a plurality of shift register sequence generators, each capable of providing a pulse sequence, b. multiplication means for multiplying modulo-2, the states of corresponding stages in said plurality of shift register generators, c. means for adding, modulo-2, all products formed by said multiplication means, the sum formed during each static state of all said shift registers being a single output of said sequence generator, and d. means for variably clocking said shift register generators at relative clock rates to cause any given generator to be clocked $n$ times faster than a preceding generator, where $n$ is the sequence period of said given generator.

2. A pulse sequence generator as claimed in claim 1 wherein said shift register sequence generators are feedback shift register generators.

3. A pulse sequence generator as claimed in claim 1 wherein said shift register generators are maximal length linear feedback shift register generators.

4. A pulse sequence generator having a cyclic period equal to $n_1 \times n_2$, where $n_1$ and $n_2$ are integers and may be equal or unequal, comprising, a. first shift register generator having a cyclic period $n_1$, b. a second shift register generator having a cyclic period $n_2$, c. multiplication means for multiplying the states of corresponding stages of said first and second shift registers modulo-2, d. addition means fo summing modulo-2 the outputs of said multiplication means, and e. clocking means for clocking said first and second shift register generators at relative rates, said second generator being clocked at a rate $n_2$ time the clock rate of said first generator.

5. A pulse sequence generator as claimed in claim 4 wherein said first and second shift register generators are maximal length linear shift register generators.

* * * * *

UNITED STATES PATENT OFFICE
CERTIFICATE OF CORRECTION

Patent No. 3,751,648 Dated August 7, 1973

Inventor(s) WILLIAM W. WU

It is certified that error appears in the above-identified patent and that said Letters Patent are hereby corrected as shown below:

Column 1

Line 29, delete "n 32 $2^m$ 31 1" and insert --n = $2^m$ -1--

Line 44, after "having" insert --a--

Column 2

Line 45, after "rate" delete "between"

Line 46, after "rate" insert --for--

Line 46, delete "1/n $x_1$" and insert --$1/n_1x_1$--

Column 3

Line 32, delete "2 0, 2 1, ..., 2 N-1" and insert --$2^{m0}$, $2^{m1}$, ..., $2^{mN-1}$--

Line 55, after "plication." delete "the" and insert --The--

Column 4

Line 23, delete "($2^3$ -1) 32 7" and insert --($2^3$ -1) + 7--

Column 5

Line 15, before "first" insert --a--

Column 6

Line 6, delete "fo" and insert --for--

Signed and sealed this 17th day of September 1974.

(SEAL)
Attest:

McCOY M. GIBSON JR.
Attesting Officer

C. MARSHALL DANN
Commissioner of Patents